United States Patent
Lin et al.

(10) Patent No.: US 10,539,976 B1
(45) Date of Patent: Jan. 21, 2020

(54) DOCKING DEVICE

(71) Applicant: GOOD WAY TECHNOLOGY CO., LTD., New Taipei (TW)

(72) Inventors: Ying-Hao Lin, New Taipei (TW); Wen-Hsien Chan, New Taipei (TW); Chin-Chang Chang, New Taipei (TW); Chih-Ming Tsao, New Taipei (TW)

(73) Assignee: GOOD WAY TECHNOLOGY CO., LTD., New Taipei (TW)

( * ) Notice: Subject to any disclaimer, the term of this patent is extended or adjusted under 35 U.S.C. 154(b) by 0 days.

(21) Appl. No.: 16/194,227

(22) Filed: Nov. 16, 2018

(51) Int. Cl.
*G06F 1/16* (2006.01)
*H04M 1/725* (2006.01)

(52) U.S. Cl.
CPC ...... *G06F 1/1632* (2013.01); *H04M 1/72527* (2013.01)

(58) Field of Classification Search
CPC .......................... G06F 1/1632; H04M 1/72527
See application file for complete search history.

(56) References Cited

U.S. PATENT DOCUMENTS

| | | | | | |
|---|---|---|---|---|---|
| 5,626,829 | A * | 5/1997 | Koutrouvelis | ..... | A61K 51/1282 424/1.11 |
| 5,884,049 | A * | 3/1999 | Atkinson | ..... | G06F 1/1632 361/679.41 |
| 6,675,237 | B1 * | 1/2004 | Asaad | ..... | G06F 13/4027 709/212 |
| 8,254,992 | B1 * | 8/2012 | Ashenbrenner | ..... | G06F 1/1632 455/41.2 |
| 8,842,429 | B2 * | 9/2014 | Ahn | ..... | G06F 1/1616 361/679.41 |
| 2004/0088452 | A1 * | 5/2004 | Scott | ..... | G06F 1/1632 710/62 |
| 2004/0174338 | A1 * | 9/2004 | Scott | ..... | G06F 1/1632 345/156 |
| 2012/0120581 | A1 * | 5/2012 | Haren | ..... | G06F 1/1607 361/679.21 |
| 2013/0297844 | A1 * | 11/2013 | Rosenberg | ..... | G06F 1/1632 710/303 |

FOREIGN PATENT DOCUMENTS

WO WO-2012083484 A1 * 6/2012

* cited by examiner

*Primary Examiner* — Glenn A. Auve
(74) *Attorney, Agent, or Firm* — Li & Cai Intellectual Property (USA) Office

(57) ABSTRACT

A docking device operates in an active mode or a passive mode. The docking device includes a path control module, a processing module and a switch. The processing module is connected to the switch, and the switch is connected between the path control module and the processing module. The path control module is configured to receive a signal from a host device. When the path control module does not receive the signal from the host device, the docking device operates in the active mode, and the processing module is connected to a plurality of function modules through the switch. When the path control module receives the signal from the host device, the docking device operates in the passive mode, and the path control module is connected to the function modules through the switch.

9 Claims, 3 Drawing Sheets

DOCKING DEVICE

FIELD OF THE DISCLOSURE

The present disclosure relates to a docking device, and more particularly to a docking device operating in an active mode or a passive mode.

BACKGROUND OF THE DISCLOSURE

Generally, mobile devices are designed to be lightweight, short, and easy to carry, and convenient for users to operate in various environments. However, due to the limited size of a mobile device, functions and extensibility of the mobile device are relatively limited.

In order to increase the function and extensibility of the mobile device, a user often needs to connect the mobile device to a required peripheral device by a docking device. For example, the user can connect a keyboard, a flash drive, a display and a mobile device through a docking device. In this way, while enjoying the convenience brought by the lightness of the mobile device, the user can increase the extensibility of the mobile device to perform more functions through the mobile device.

In other words, the role played by an existing docking device is a transfer station between the mobile device and the peripheral device, and the main working mechanism is to transmit a signal provided by the mobile device to a corresponding peripheral device. For example, a video signal provided by the mobile device is transmitted to a display for playing a video.

SUMMARY OF THE DISCLOSURE

In order to increase a functionality of a docking device, the present disclosure provides a docking device operating in an active mode or a passive mode.

In one aspect, the present disclosure provides a docking device including a path control module, a processing module and a switch. The processing module is connected to the switch, and the switch is connected between the path control module and the processing module. The path control module is configured to receive a signal from a host device. When the path control module does not receive a signal from a host device, the docking device operates in the active mode, and the processing module is connected to a plurality of function modules through the switch. When the path control module receives the signal from the host device, the docking device operates in the passive mode, and the path control module is connected to the function modules through the switch.

In the present disclosure, when the docking device operates in the active mode, the processing module receives a control signal through an operation interface, and the processing module operates according to the control signal to generate a data signal. The processing module then transmits the data signal to one of the function modules, so that the one of the function modules processes the data signal to generate a data and transmit the data to a peripheral device. In an embodiment, the operation interface includes a plurality of shortcut keys, and each of the shortcut keys is configured to trigger the control signal corresponding to a specific function. For example, the operation interface includes a plurality of mechanical buttons or a touch screen.

Therefore, a main feature of the docking device provided by the present disclosure is that the docking device of the present disclosure not only transfers a data signal between the mobile device and a peripheral device, but also generates the data signal by itself and transmits the data signal to the peripheral device.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
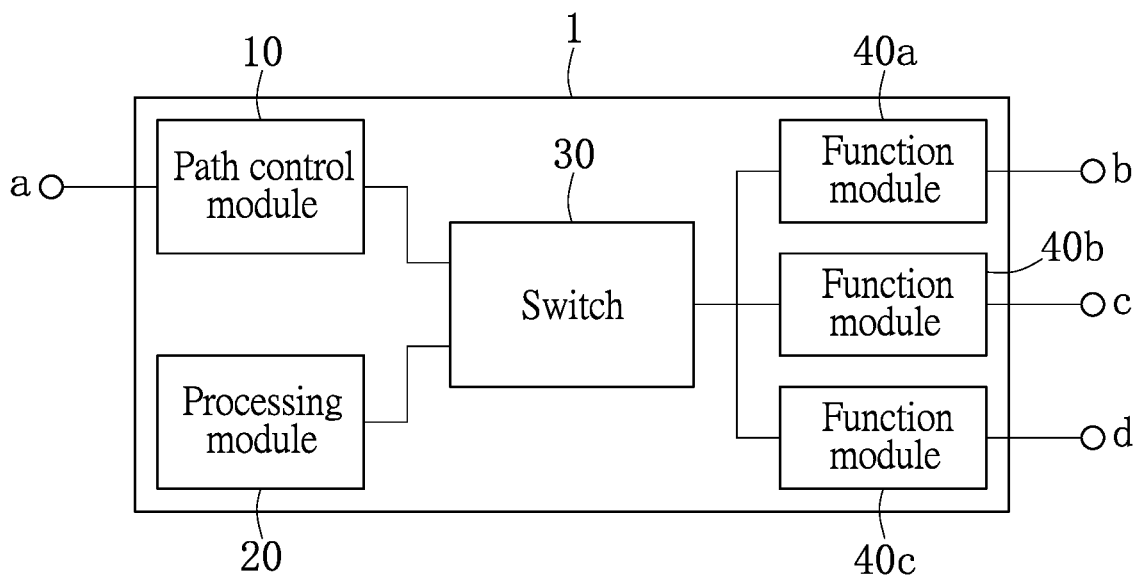
FIG. 1 is a block diagram showing a docking device depicted in accordance with an exemplary embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Referring to FIG. 1 which is a block diagram showing a docking device depicted in accordance with an exemplary embodiment of the present disclosure.

As shown in FIG. 1, a docking device 1 includes a path control module 10, a processing module 20, and a switch 30. The processing module 20 is connected to the switch 30. The switch 30 is connected between the path control module 10 and the processing module 20. In addition, the docking device 1 also includes a plurality of function modules 40a, 40b, 40c, and a plurality of interfaces a, b, c, d. The interfaces a, b, c, d are configured to connect to host devices (e.g. notebook, tablet, etc.) or peripheral devices (e.g. display, keyboard, mouse, flash drive, etc.).

The docking device 1 operates in an active mode or a passive mode. Generally, an operation principle of the docking device 1 is that when the path control module 10 does not receive a signal from a host device, the docking device 1 operates in the active mode, and the processing module 20 is connected to the plurality of function modules 40a, 40b, 40c through the switch 30. On the other hand, when the path control module 10 receives the signal from the host device, the docking device 1 operates in the passive mode, and the path control module 10 is connected to the function modules 40a, 40b, 40c through the switch 30.

In the following description, the case where the docking device 1 operates in the passive mode and the case where the docking device 1 operates in the active mode will be described.

In the docking device 1, the path control module 10 is configured to receive a signal from a host device, e.g. signal from notebook, tablet, etc. When the path control module 10 receives the signal from the host device, it represents that the docking device is connected to the host device through the interface. At this time, the docking device operates in the passive mode.

In the passive mode, an operation of the docking device 1 is to transfer a data signal between the host device and the peripheral device. Thus, when the docking device 1 operates in the passive mode, the switch 30 is switched, such that the path control module 10 is connected to the function modules 40a, 40b, 40c through the switch 30. The path control module 10 then transmits the signal of the host device to one of the function modules 40a, 40b, 40c to execute a related function or to process the signal from the host device through one of the function modules 40a, 40b, 40c, and to transmit a data generated by the signal processing to a peripheral device.

For example, when the docking device 1 is connected to a notebook (e.g. the host device) through the interface a and then operates in the passive mode, the path control module 10 transmits a video signal of the notebook to a display (e.g. the peripheral device) through the switch 30 for playing a video. In addition, the path control module 10 stores a file of the notebook in the flash drive (e.g. the peripheral device) through the switch 30.

On the other hand, in the active mode, the operation of the docking device 1 is to generate a data signal by itself and transmit the data signal to the peripheral device. Thus, when the docking device 1 operates in the active mode, the switch 30 is switched, such that the processing module 20 is connected to the function modules 40a, 40b, 40c through the switch 30. At this time, the processing module 20 receives a control signal through an operation interface (not shown) and operates according to the control signal to generate a data signal and transmit the data signal to one of the function modules 40a, 40b, 40c, so that one of the function modules 40a, 40b, 40c processes the data signal to generate a data and transmit the data to a peripheral device.

Figure 2:
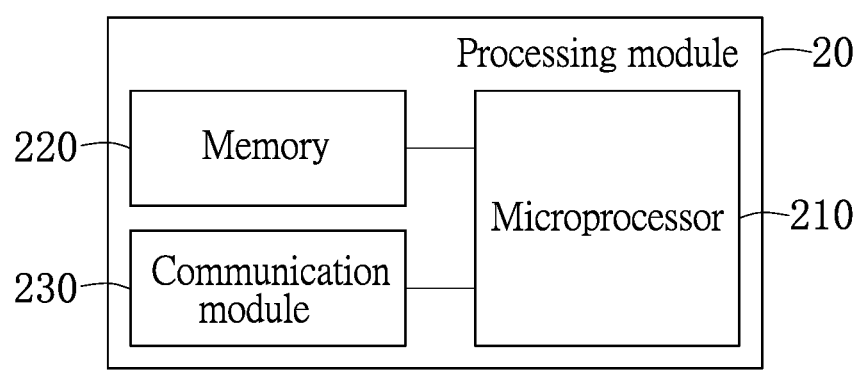
FIG. 2 shows a block diagram of a processing module in the docking device of FIG. 1.

Further referring to FIG. 2 which shows a block diagram of a processing module in the docking device of FIG. 1.

As shown in FIG. 2, the processing module 20 of the docking device 1 includes a microprocessor 210, a memory 220 and a communication module 230. The memory is connected to the microprocessor 210, and the communication module 230 is connected to the microprocessor 210.

As above-mentioned, when the docking device 1 operates in the active mode, the processing module 20 receives a control signal through an operation interface, and operates according to the control signal. In the processing module 20, the microprocessor 210 is connected to a network through the communication module 230 according to the control signal to obtain the data signal, and transmit the data signal to one of the function modules 40a, 40b, 40c. For example, the operation interface of the above-mentioned is configured in the docking device 1 and includes a plurality of mechanical buttons or a touch screen. The memory 220 can be a Dynamic Random Access Memory or an SPI Flash. The communication module 230 can be a WIFI communication module, a 3G communication module or a 4G communication module, and the present disclosure is not limited therein.

In order to increase a convenience of the docking device 1 operating in the active mode, in an embodiment, the operation interface of the above-mentioned includes a plurality of shortcut keys. In other words, the mechanical buttons or touch buttons of a touch screen are set as the shortcut keys. More specifically, each of the shortcut keys is configured to trigger the control signal corresponding to a specific function.

For example, assuming that the docking device 1 is not connected to the host device and operates in the active mode, the docking device 1 is connected to a display, and a shortcut key on the operation interface is set to trigger a control signal of "connect to a specific web page". In this case, if the shortcut key is pressed, the microprocessor 210 receives the control signal of "connect to a specific web page". The microprocessor 210 is then connected to the network through the communication module 230 to obtain a data signal of the above-mentioned specific web page and transmit the data signal to one of the function modules 40a, 40b, 40c, such that the display can display the above-mentioned specific web page. For example, the specific web page can be a specific browser page, a home page of a specific enterprise website, or a stock trading page of a specific brokerage, etc.

In addition, in the above examples, assuming that the docking device 1 is connected to two displays (e.g. a first display and a second display), another shortcut key on the operation interface may be set to trigger a control signal of "display on multi-displays". In this case, if the first display already displays the above-mentioned specific web page and the shortcut key for "display on multi-displays" is pressed, the microprocessor 210 receives the control signal of "display on multi-displays". The microprocessor 210 then transmits a signal to one of the function modules 40a, 40b, 40c, such that the above-mentioned specific web page is displayed on the first display and the second display at the same time.

In addition, in the above-mentioned embodiment, assuming that the docking device 1 is further connected to a flash drive, when the user connects to the specific web page or email address and clicks a file connection to download the file, the microprocessor 210 stores the downloaded file in the flash drive. At this time, if the user needs to check the downloaded file, or even edit the downloaded file, the user can check or edit the downloaded file under the condition that the docking device 1 is connected to a cloud editing software.

It is worth mentioning that when the docking device 1 is in the active mode, the microprocessor 210 is connected to the network through the communication module 230 to obtain a data signal of a predetermined web page and transmit the data signal to one of the function modules 40a, 40b, 40c, such that a display connected to the docking device 1 can actively display the predetermined web page after the docking device 1 enters the active mode.

In the following description, types of the function modules 40a, 40b, 40c and connection relationship between the function modules 40a, 40b, 40c, the path control module 10, the processing module 20 and the switch 30 in the docking device 1 of the present disclosure will be described.

In the present disclosure, one of the function modules 40a, 40b, 40c of the docking device 1 can be a power supply module. The power supply module is connected to the path control module 10, and configured to receive a power provided by the host device to supply the power to the path control module 10, the processing module 20, the switch 30 and other function modules for operation. Moreover, one of the function modules 40a, 40b, 40c of the docking device 1 can be a data access module. The data access module is connected to the path control module 10 and the processing module 20 through the switch 30, and configured to store a data transmitted from the path control module 10 or the processing module 20 to a peripheral device, or read a data of the peripheral device. In addition, one of the function modules 40a, 40b, 40c of the docking device 1 can be a video signal conversion module. The video signal module is connected to the path control module 10 and the processing module 20 through the switch 30, and configured to convert a video signal transmitted from the path control module 10 or the processing module 20 to output the converted video signal to a peripheral device for playing a video.

It should be noted that those skilled in the art should understand operation principles of the power supply module, the data access module and the video signal conversion module in the docking device 1. Therefore, the operation details of the power supply module, the data access module and the video signal conversion module will not be described herein.

Figure 3A:
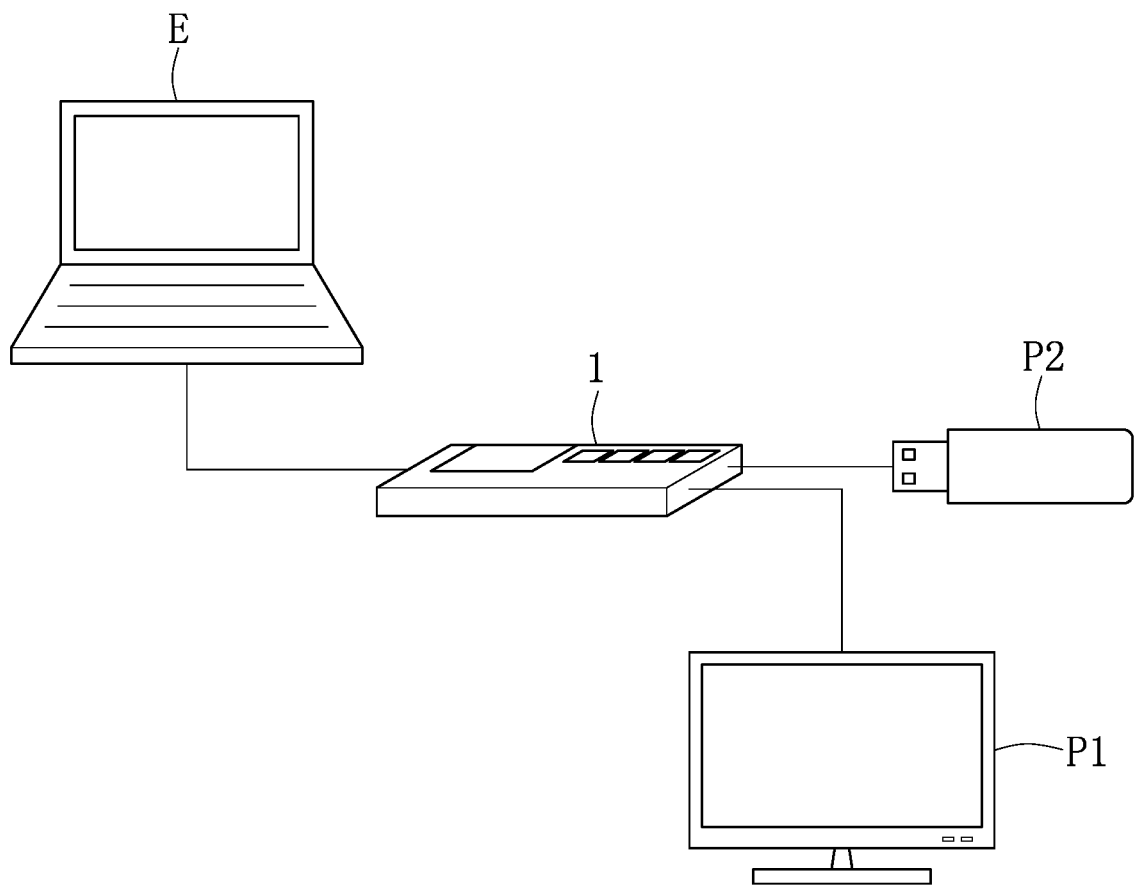
FIG. 3A is a schematic view showing a docking device operating in a passive mode depicted in accordance with an exemplary embodiment of the present disclosure.
Figure 3B:
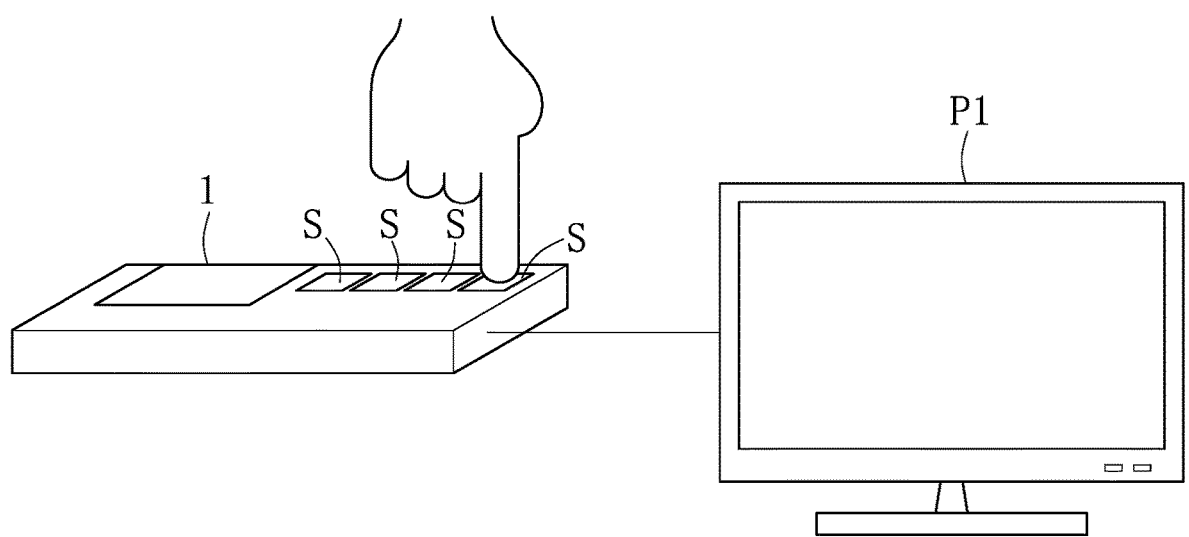
FIG. 3B is a schematic view showing a docking device operating in an active mode depicted in accordance with an exemplary embodiment of the present disclosure.

Finally, reference is made to FIGS. 3A and 3B. FIG. 3A is a schematic view showing a docking device operating in a passive mode depicted in accordance with an exemplary embodiment of the present disclosure. FIG. 3B is a schematic view showing a docking device operating in an active mode depicted in accordance with an exemplary embodiment of the present disclosure.

As shown in FIG. 3A, in the present disclosure, when the docking device 1 is connected to a host device E (e.g. a notebook) through the interface a and then operates in the passive mode, the docking device 1 transmits a video signal of the notebook to a peripheral device P1 (e.g. the display) for playing a video. In addition, the docking device 1 stores a file from the host device E (e.g. a notebook) in a peripheral device P2 (e.g. a flash drive).

On the other hand, as shown in FIG. 3B, in the present disclosure, when the docking device 1 is not connected to a host device and then operates in the passive mode, the docking device 1 can operate according to a control signal from the operation interface. For example, as shown in FIG. 3B, the docking device 1 is connected to a peripheral device P1 (e.g. a display), and one of the shortcut keys on the operation interface is set to trigger a control signal of "connect to a specific web page". In this case, if the shortcut key is pressed, the docking device 1 is connected to the network according to the control signal triggered by the shortcut key to obtain a data signal of the above-mentioned specific web page and transmit the data signal to the above-mentioned peripheral device P1, such that the peripheral device P1 can display the above-mentioned specific web page.

THE ADVANTAGES OF THE PRESENT DISCLOSURE

In conclusion, compared with the existing docking device, the docking device provided by the present disclosure has the advantages that the docking device of the present disclosure can not only transfer a data signal between a mobile device and peripheral devices, but can also independently generate the data signal and transmit the data signal to the peripheral devices.

On the other hand, when the docking device provided by the present disclosure is connected to a host device and peripheral devices at the same time, a user can transfer a data signal of the host device to the peripheral devices through the docking device of the present disclosure. Moreover, when the docking device of the present disclosure is only connected to the peripheral devices, the user can execute several functions by operating the docking device of the present disclosure, such as viewing a web page, sending and receiving emails, displaying a video in multi-screened manner, etc.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A docking device, operating in an active mode or a passive mode, comprising:
    a path control module configured to receive a signal from a host device;
    a processing module connected to a switch, the switch connected between the path control module and the processing module; and
    a power supply module connected to the path control module;
    wherein the power supply module configured to receive a power provided by the host device to supply the power to the path control module, the processing module, the switch and a plurality of function modules for operation; when the path control module does not receive the signal from the host device, the docking device operates in the active mode, and the processing module is connected to the function modules through the switch; when the path control module receives the signal from the host device, the docking device operates in the passive mode, and the path control module is connected to the function modules through the switch.

2. The docking device according to claim 1, wherein in the active mode, the processing module receives a control signal through an operation interface, the processing module operates according to the control signal to generate a data signal and transmit the data signal to one of the function modules, so that one of the function modules processes the data signal to generate a data and transmit the data to a peripheral device.

3. The docking device according to claim 2, wherein the processing module includes:
   a microprocessor;
   a memory connected to the microprocessor; and
   a communication module connected to the microprocessor;
   wherein in the active mode, the microprocessor is connected to a network through the communication module according to the control signal to obtain the data signal and transmit the data signal to one of the function modules.

4. The docking device according to claim 3, wherein when the docking device operates in the active mode, the microprocessor is connected to the network through the communication module to obtain a data signal of a predetermined web page.

5. The docking device according to claim 2, wherein the operation interface includes a plurality of mechanical buttons or a touch screen.

6. The docking device according to claim 5, wherein the operation interface includes a plurality of shortcut keys, and each of the shortcut keys is configured to trigger the control signal corresponding to a specific function.

7. The docking device according to claim 1, wherein in the passive mode, the path control module transmits the signal from the host device to one of the function modules to execute a related function or to process the signal from the host device through one of the function modules, and to transmit a data generated by the signal processing to a peripheral device.

8. The docking device according to claim 1, wherein the function modules include:
   a data access module connected to the path control module and the processing module through the switch and configured to store a data transmitted from the path control module or the processing module to a peripheral device, or read a data of the peripheral device.

9. The docking device according to claim 1, wherein the function modules includes:
   a video signal conversion module, connected to the path control module and the processing module through the switch and configured to convert a video signal transmitted from the path control module or the processing module to output the converted video signal to a peripheral device for playing a video.

* * * * *